United States Patent [19]

Mohn

[11] Patent Number: 4,953,636

[45] Date of Patent: Sep. 4, 1990

[54] ELECTRICAL CONDUCTOR ARRANGEMENTS FOR PIPE SYSTEM

[75] Inventor: Frank Mohn, London, England

[73] Assignee: Framo Developments (UK) Limited, London, England

[21] Appl. No.: 210,784

[22] Filed: Jun. 24, 1988

[30] Foreign Application Priority Data

Jun. 24, 1987 [GB] United Kingdom ................. 8714754

[51] Int. Cl.[5] .................... E21B 17/02; E21B 47/00
[52] U.S. Cl. ................. 166/65.1; 166/242; 285/55; 439/191
[58] Field of Search ............ 166/242, 243, 65.1, 166/380; 174/47; 285/55, 921; 439/191, 192; 324/347

[56] References Cited

U.S. PATENT DOCUMENTS

| | | | |
|---|---|---|---|
| 2,000,716 | 5/1935 | Polk . | |
| 3,879,097 | 4/1975 | Oertle | 439/191 |
| 4,012,092 | 3/1977 | Godbey | 439/191 |
| 4,067,596 | 1/1978 | Kellner et al. | 175/215 |
| 4,105,279 | 8/1978 | Glotin et al. | 339/94 R |
| 4,683,944 | 8/1987 | Curlett | 166/65.1 |
| 4,690,212 | 9/1987 | Termohlen | 166/65.1 |
| 4,700,778 | 10/1987 | Smith et al. | 166/65.1 |
| 4,709,946 | 12/1987 | Hunter | 285/55 |

FOREIGN PATENT DOCUMENTS

| | | |
|---|---|---|
| 0063444 | 10/1982 | European Pat. Off. . |
| 0102672 | 3/1984 | European Pat. Off. . |
| 2214852 | 8/1974 | France ..................... 174/47 |
| WO8401189 | 3/1984 | PCT Int'l Appl. . |
| 2130380 | 5/1984 | United Kingdom . |

Primary Examiner—Stephen J. Novosad
Assistant Examiner—Terry Lee Melius
Attorney, Agent, or Firm—Young & Thompson

[57] ABSTRACT

A pipe assembly for use in production or drilling systems comprises a plurality of pipe members connected together in end-to-end relationship and a plurality of tubular conductor members electrically connected together in end-to-end relationship. The members have co-operating tapered or stepped portions, and/or screw-threaded portions whereby the pipe members support the conductor members in internal or external coaxial relationship. A logging unit can be moved along the assembly unit under fluid pressure to engage stop means for connecting the unit with the conductor members, or a logging unit can be incorporated in a pipe member wall. An outer pipe can surround the pipe assembly to provide with the pipe assembly interior two passages for the reception, flow or circulation of fluids, for example extracted oil and/or gas and barrier fluid.

25 Claims, 5 Drawing Sheets

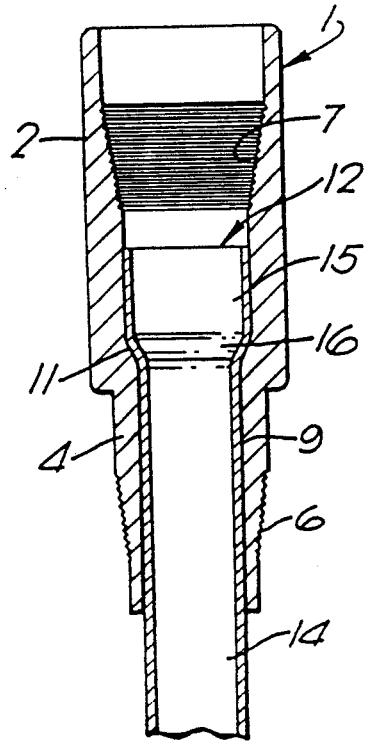
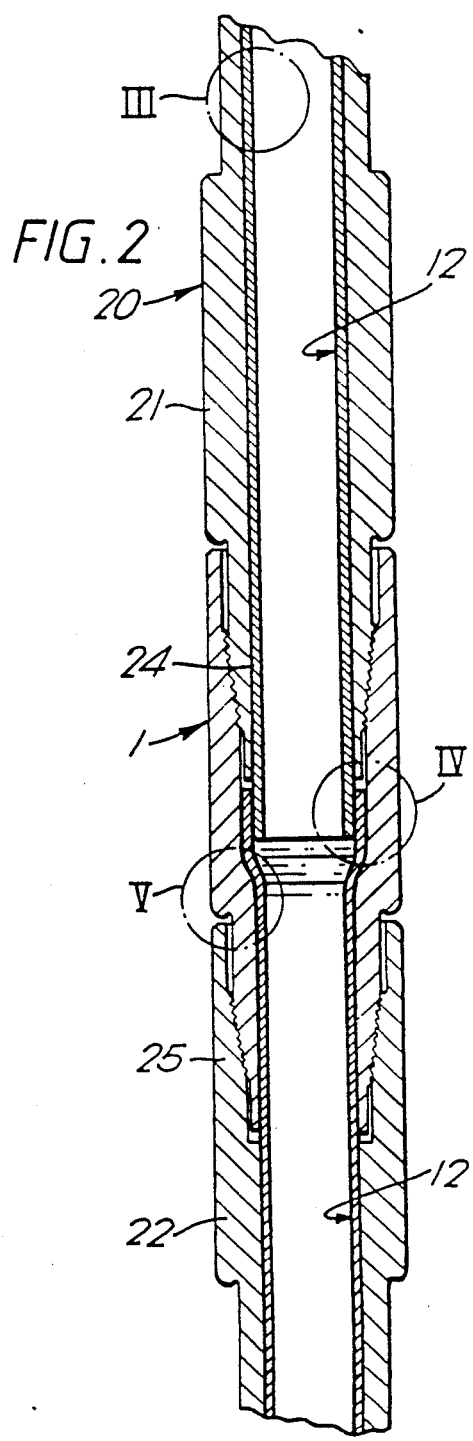

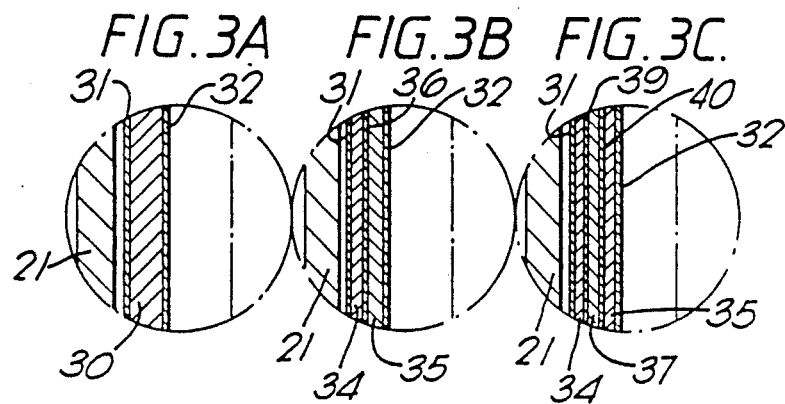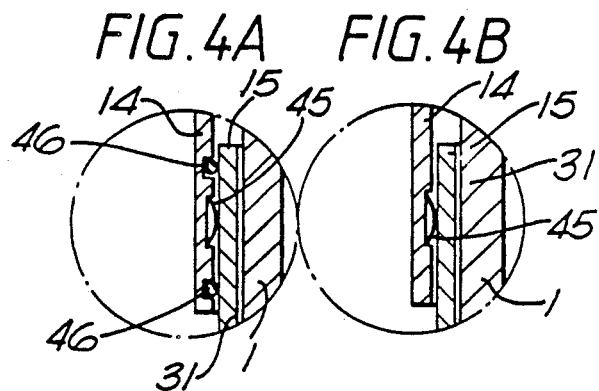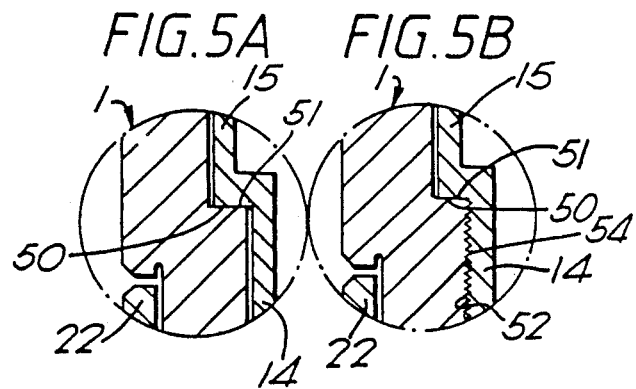

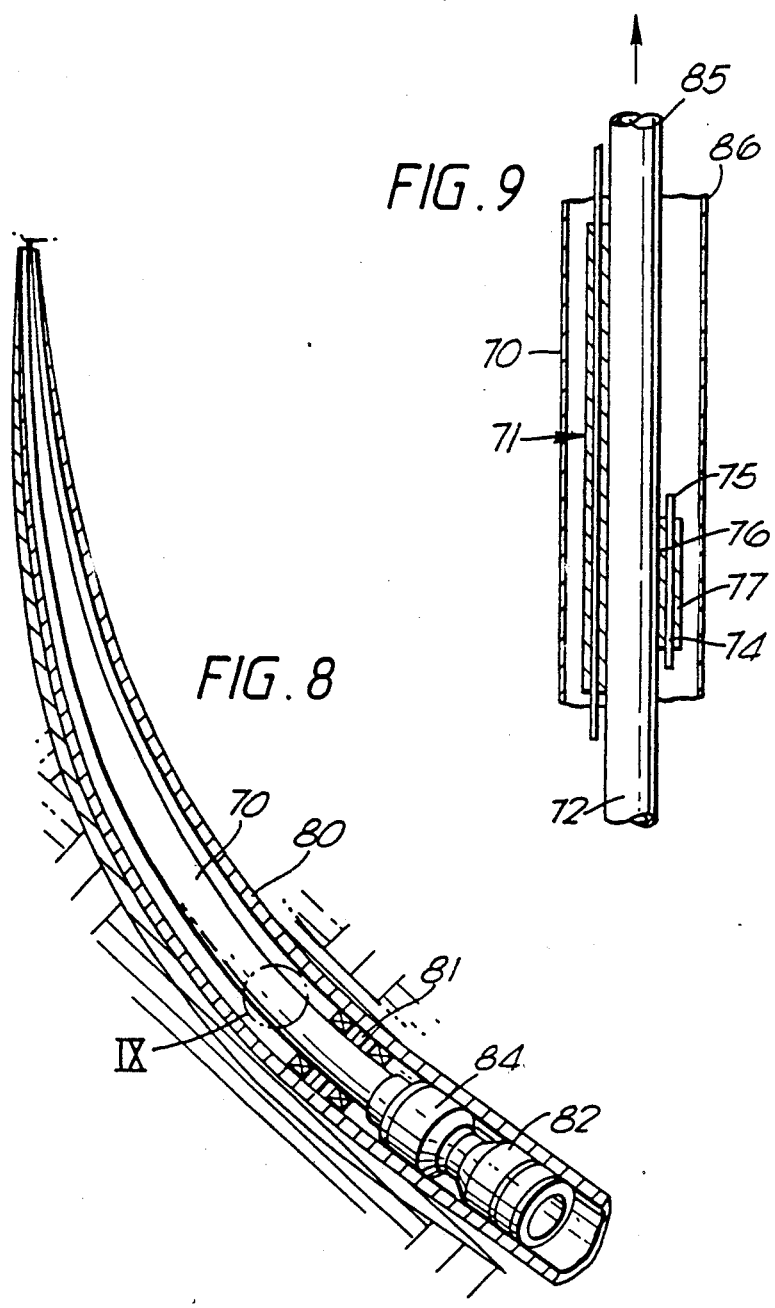

ELECTRICAL CONDUCTOR ARRANGEMENTS FOR PIPE SYSTEM

FIELD OF THE INVENTION

The invention relates to a pipe assembly including an electrical conductor or conductors, for use, in particular, in a production or drilling pipe system.

BACKGROUND OF THE INVENTION

It is necessary to measure conditions in a drill hole, not only during the course of drilling, but after the drilling has been completed. While drilling, information is required about the condition of the rock being drilled (formation logging), about the drilling operation itself, for example, as to the weight acting on the drill bit, and the drill bit location, and about the physical conditions, for example, pressure and temperature, under which the drilling is taking place. When production has started, after drilling has been completed, information is required about flow amounts and conditions when the well is in production, together with information about the physical conditions at the rock formation whether the well is in production or not.

The necessary information is normally sensed by a logging unit which has to be located as close as possible to the position about which information is required. The unit may be installed together with a drill bit or may be sent down into a well by wireline techniques. The unit contains sensors and processing equipment for the sensor outputs. The data obtained may be recorded for reply when the logging unit is retracted, but is otherwise transmitted to the surface by a signal transmission system which may make use, as transmission conductors, of the earth, the drilling or production pipe, the drilling mud employed for drilling, or separate electric cables. The signals obtained in this way from the logging unit are received and decoded by a unit with appropriate detection and coding element.

The logging equipment should interfere as little as possible with extraction and drilling operations, and give accurate components and having a low cost. It must also have high reliability, with a service life of hundreds of hours, and any failure during operation should be easily rectified.

Normal conditions of operation however make it difficult to meet these requirements. Although well conditions vary considerably, temperatures of up to 150° C. and pressures up to 1,000 bars are experienced. Vibrational loads up to 1,000 g can be experienced during drilling, and erosion and abrasion can result from varying qualities of drilling mud supplied along the interior of the rotating drill pipe. Power supply is a problem as batteries cannot provide adequate energy at the high temperatures experienced and wireline techniques are difficult to use where a pipeline deviates substantially from the vertical. Transmission rates also present difficulties because a large amount of data has to be carried, so a large data handling capacity is needed.

SUMMARY OF THE INVENTION

The invention accordingly provides a pipe element for insertion in a pipe assembly, which can constitute or be part of a production or drilling pipe system, the pipe element being arranged to support an elongate electrical conductor means so as to extend along the pipe assembly. The conductor means is conveniently tubular and is supported to extend concentrically of the pipe element. It can be carried internally or externally of the pipe element and can comprise a single conductor tube or two or more such tubes, associated with suitable insulation. The pipe element, in conjunction with other pipe elements or sections, can function as a second or further conductor, or as an internal or external liner to the conductor means.

The conductor means can be simply suspended from the pipe element as by being shaped to rest on a shelf or tapered portion of the element, and/or it may be positively secured to the element, as by a screwthreaded connection. Each end of the conductor means is configured at its upper and lower ends so as to make good electrical connection with adjoining like upper and lower conductor means, as by a friction fit or by spring contact members, such that the electrical connection is obtained on assembly of the pipe elements without special connection steps being required.

The pipe element of the invention is preferably arranged to be received in the production or drilling pipe system between adjacent standard pipe elements or sections, the element having at its ends standard couplings, for example screw-threaded couplings, for connection with the standard coupling of the adjacent conventional pipe sections. The pipe element may thus be constituted as an insert element or distance piece spacing apart longer standard pipe sections, but the element can also be constituted as such a standard pipe section modified only to the extent needed to provide support for the conductor means.

The invention further provides a production or drilling pipe assembly comprising a plurality of pipe elements or sections assembled together end-to-end to form a pipe stack, with tubular conductor means extending internally or externally therealong, the conductor means being supported by the pipe stack at positions spaced therealong.

The conductor means can be advanced into place along existing piping. This avoids a difficulty with wireline techniques where the piping deviates, that is, departs from the vertical, even to the extent of extending horizontally, as the wiring cannot readily be advanced by pushing forces applied along its length. The relatively stiff conductor tubing of the invention presents no such problem and so is capable of performing wireline mechanical operations, as well as being readily advanced into or withdrawn from electrical communication with one or more downhole logging or operational units.

The conductor means of the invention can be advanced along a pipeline or other piping by in-built electric traction or drive means. The conductor means can thus incorporate one or more linear electric motor stator windings which co-operate with the piping along which it is to be fed, using this as a continuous rotor portion for the or each such motor.

The interior of the conductor means of the invention, however installed within the pipeline, can be employed for conveying drilling mud or extracted fluids, a barrier fluid or an injection fluid for well stimulation. The tubular conductor means can be spaced within the pipeline so that not only its interior but also the annular space between it and the pipeline can be used for fluid movement. A supply liquid can be used as a pressure medium for signalling and control, to supervise or operate downstream equipment.

The conductor means provides for power and/or signal transmission between surface equipment and one or more downhole operational and/or logging units. At least one of the pipe elements included in a pipe system can itself incorporate a logging unit within the wall, with conductive or inductive coupling between the unit and the conductor means. The invention thus provides a pipe element for incorporation in a pipe system, in particular a production or drilling pipe system, the pipe element incorporating a logging unit and/or activating unit therein in the tubular wall thereof.

The conductor means can instead provide a guide for the passage down the pipe system of a logging unit and/or operational unit, under fluid pressure or by wireline techniques. The pipe element can then have stop or abutment means to define the end of the downward movement of the logging unit. The unit can be coupled to the conductor means inductively or by means of contacts exposed on the unit and on the pipe element, for example on the stop means.

The invention will thus be seen to provide a pipe element whereby conductor means can be included in a pipe system without substantially complicating the assembly of the system and without substantially restricting its function, for example, in a drilling or extraction pipe system, conveying drilling, lubrication, cooling or extracted gases and/or liquids. The conductor means moreover is readily capable of transmitting a large quantity of data derived from one or more logging units, which may be integrated into the system by means of the pipe element, so the invention conveniently facilitates periodical or continuous logging at one or more positions along a pipeline, together control and/or operation of equipment.

BRIEF DESCRIPTION OF THE DRAWINGS

FIG. 1 is a sectional view through an insert pipe element, for use in a pipe assembly in accordance with the invention;

FIG. 2 is a similar partial view of a pipe assembly having the insert pipe element of FIG. 1 incorporated therein between two conventional pipe elements;

FIGS. 3A, 3B and 3C and fragmentary sectional views corresponding to the region III of FIG. 2 but on a larger scale, showing respectively three different kinds of conductor tubing received within the pipe element of FIG. 1;

FIGS. 4A and 4B and fragmentary sectional views corresponding to the region IV of FIG. 2 but on a larger scale, showing two different electrical coupling arrangements between conductors within the pipe assembly of FIG. 2;

FIGS. 5A and 5B are fragmentary sectional views corresponding to the region V of FIG. 2 but on a larger scale, showing two different arrangements for mounting a conductor tubing within the pipe element of FIG. 1;

FIG. 8 is a perspective view of a further pipe assembly in accordance with the invention in a downhole electrical conducting production pipe system;

FIG. 9 is a fragmentary part-sectional view of the pipe system of FIG. 8;

Figure 6:
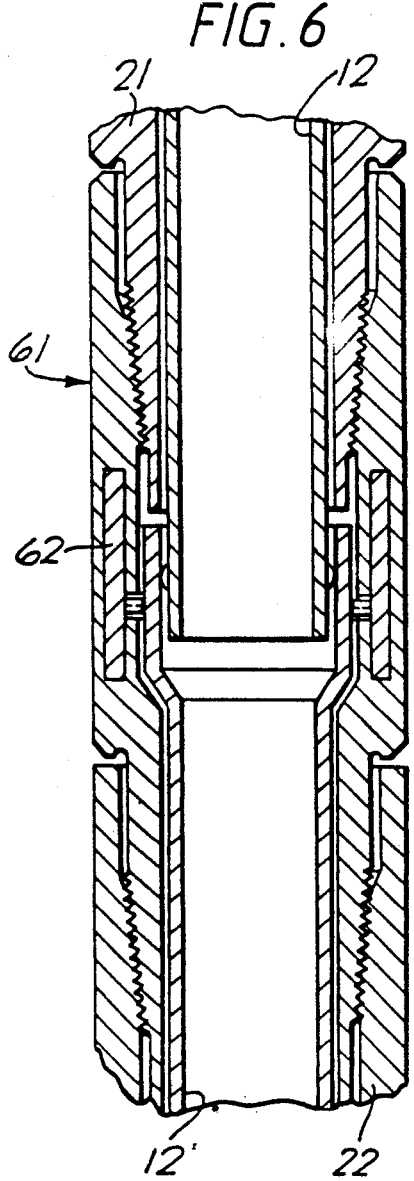
FIG. 6 is a view similar to that of FIG. 2 but showing, on a larger scale, a second pipe insert element according to the invention which incorporates a logging unit.

The insert pipe element 1 shown in FIG. 1 comprises externally an upper portion 2 of circular cylindrical shape from the lower end of which extends a shorter intermediate portion 4, also of circular cylindrical shape but of smaller diameter, and a lower inwardly tapering screw-threaded portion 6. Internally, the upper portion has an inwardly tapering screw-threaded portion 7, shaped correspondingly to the screw-threaded portion 6, between two circular cylindrical portions of which the lower is connected to a smaller diameter cylindrical portion, by way of a short frusto-conical portion 11. An electrical conductor element in the form of conductor tubing 12 received concentrically within the pipe element 1 extends from beneath the internally screw-threaded portion 7 downwardly beyond the lower end of the pipe element. The conductor tubing 12 is of substantially uniform wall thickness and is shaped to correspond to the internal shape of the portions of the pipe element to which it is adjacent. The tubing 12 thus has a major lower portion 14 joined to a shorter upper portion 15 of larger diameter by a frusto-conical intermediate portion 16. The portion 14 provides a spigot portion for reception in a socket constituted by the portion 15 of the adjacent underlying conductor element.

In FIG. 2, the insert pipe element 1, together with the conductor tubing 12, is shown in place in a pipe assembly 20. The pipe assembly 20 comprises upper and lower standard pipe elements 21,22 which may be identical, of which the upper element 21 is provided at its lower end with an external tapered screw-threaded portion 24 engaged with the internally threaded screw portion 7 of the pipe element 1. The lower pipe element 22 has at its upper end a tapered internally screw-threaded portion 25 engaged with the externally screw-threaded portion 6 at the lower end of the pipe element 1. The insert element 1 thus completely maintains the structure and function of the pipe assembly 20 between the elements 21 and 22.

The portion 14 of the conductor tubing 12 extends downwardly from the insert element 1 within the lower standard pipe element 22 to slightly beyond the lower end of this, and the corresponding portion of like conductor tubing extends beyond the lower end of the upper standard pipe element 21, to be received within the upper end portion 14 of the conductor tubing within the insert element. These portions are in electrical communication as described below.

The illustrated pipe assembly 20 thus has extending along it electrically continuous internal conductor tubing comprising separate electrically connected lengths of conductor tubes 12 each of which is suspended from an associated insert pipe element 1.

In an alternative arrangement, the piping constituted by the elements 1, 21 and 22 can support external conductor tubing and then acts as a liner for the tubing. The interior of the conductor tubing 12 or of such a liner can convey fluid, for example oil, gas or mud, and the pipe assembly can be associated with additional concentric inner and/or outer piping to provide an additional fluid path or paths. Insulation for the conductor tubing can be provided by a suitable liquid and/or gas. The fluids can be circulated or transported from the top of the well for consumption in the well, or may be extracted from the well and conveyed to the top. Thus gas or water can be injected into the well, or a cooling and/or lubricating fluid can be carried to a motor unit in the well, or gas and oil can be separately carried out from the well.

The conductor tubing 12 is shown schematically in FIGS. 1 and 2, and FIGS. 3A, 3B and 3C show respectively three possible different forms the tubing can take.

In FIG. 3A, the tubing 12 comprises a single tubular conductor 30 having external and internal layers 31 and 32 of solid dielectric material, suitably an insulating plastics material, whilst in FIG. 3B, the tubing comprises two concentric tubular conductors 34 and 35, with the insulating layers 31 and 32 provided externally of the outer conductor tube 34 and internally of the tube 35, with an additional insulating layer 36, which may be similarly constituted, between them. FIG. 3C illustrates a form of the conductor tubing in which a third concentric conductor tube 37 is located between tubes 34 and 35, with insulating layers 39 and 40, similar to the layer 36, between it and them.

The number of electrically separate conductor tubes forming the conductor tubing 12 can thus be selected according to need. The screw-connected pipe elements 1, 21 and 22 of the pipe assembly 20 can be employed as another conductor, for example an earthing conductor.

Electrical connection arrangements for the conductor tubing shown schematically in FIGS. 1 and 2 are illustrated in detail in FIGS. 4A and 4B.

The ends of the conductor tubing portions 14 and 15, each constituted by a conductor tube 30 as shown in FIGS. 3A, which are in overlapping relationship are free of insulation over lengths sufficient to allow for thermal expansion and for normal manufacturing length variations. Although a friction fit between the tubes can be employed, good electrical connection is preferably ensured by spring contact means. Thus as shown in FIGS. 4A and 4B, the lower end of the tubing portion 14 is surrounded by an external groove which receives a spring conductor band 45 exhibiting an outwardly bowed configuration in radial cross-section. The central part of the band 45 extends outwardly beyond the outer surface of the tubing portion 14 to make good electrical contact with the cylindrical inner surface of the overlapping tubing portion 15.

As shown in FIG. 4A, sealing means between the tubing portions 15 and 15 is provided in the form of sealing rings 46 received in grooves 47 above and below the spring contact band 45. Alternatively, metallic or labyrinth seals can be employed. A predetermined amount of leakage can be provided for, for example, to provide for mixing, separation, cooling, lubrication or pressure relief, depending on the circumstances of use of the pipe system.

It will be understood that where the conductor tubing portions 14 and 15 are constituted by a plurality of concentric tubular conductors as shown in FIGS. 3B and 3C, the ends of the tubes are spaced apart, so that each tube of the portion 14 establishes connection with the like tube of the portion 15 by connector arrangements corresponding to those described with reference to FIGS. 4A and 4B.

In FIGS. 1 and 2, the axial relationship between the conductor tubing 12 and the pipe element 1 is determined by the engagement of the frusto-conical portion 16 with the correspondingly shaped interior portion 11 of the pipe element. As shown in FIGS. 5A and 5B, the frusto-conical portion 11 of the element 1 can be replaced by a step portion 50 at right angles to the pipe element axis, the conductor tubing 12 being provided with a corresponding step formation 51 between the portions 14 and 15.

The conductor tubing 12 can thus hang freely from the pipe element 1, with possible upward movement of the tubing within the pipe element from the position shown. By the provision of appropriately shaped interengaging formations on the pipe element and the tubing, the tubing and the pipe element can instead be secured together to prevent relative axial and/or angular movement. In the assembly of FIG. 5A, the step 51 of the conductor tubing 12 simply rests on the step 50 of the pipe element 1 but, in the assembly of FIG. 5B, an internal screw threaded portion 52 is provided in the pipe element just below the step, for engagement with a co-operating external screw thread portion 54 on the conductor tubing 12. In any arrangement, electrical insulation effective between the tubing and the pipe element is provided.

Figure 7:
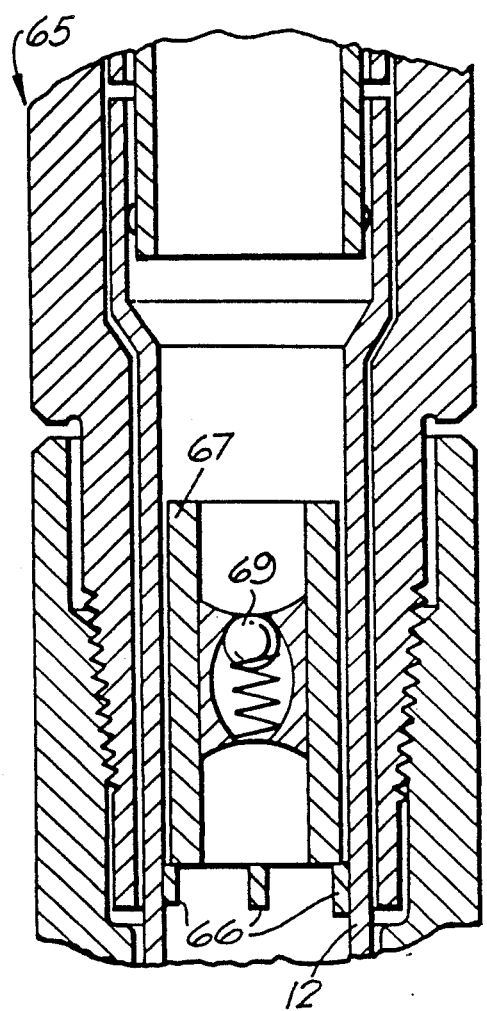
FIG. 7 is a view similar to FIG. 6, but on a still larger scale, showing a third pipe insert element according to invention.

In FIGS. 6 and 7, parts corresponding to those illustrated in FIGS. 1 and 2 are indicated by the same reference numerals.

FIG. 6 illustrates a pipe insert element 61 which corresponds in shape to the pipe element 1 of FIGS. 1 and 2, but which has been modified to incorporate a sensor or logging unit 62. The element 61 thus allows a logging unit to be installed in a well during assembly of a drill pipe stack or during installation of production piping, as an integral part.

The logging device 62 contains appropriate electronic and/or mechanical sensors together with signal processors and transmitting means. The transmission of power and control signals to the unit 62, and of data from it, is effected by way of the conductor tubing 12 by means of conductors extending between the unit and the conductor tubing, or by inductive coupling means. The conductor tubing 12 can be continued down the pipe assembly below the logging unit 62, for power supply to at least one further logging unit located below the unit 62 and for data transmission from it.

The insert pipe element 65 of FIG. 7 again closely resembles the insert pipe element 1, but is provided with stop elements or abutments 66 projecting internally, for preventing further downward movement within the pipe system of a logging unit 67. A logging unit 67, can be moved down the pipe system by wireline techniques or under fluid pressure, is generally cylindrical, and makes a free sliding fit within the conductor tubing 12. The sensors, signal processors and transmitters of the unit 67 are located within its cylindrical wall, and a non-return valve 69 closes the interior of the cylinder against upward fluid flow through the device. Electrical power supply and signal transmission connections between the unit 67 and the tubing 12 are effected either inductively or by way of contacts exposed at the abutments 66 and at the lower end of the cylindrical wall of the unit.

One or more additional logging units of similar construction can be stacked on top of the unit 67, either to serve as replacement units in the event of failure, or so as to extend the zone from which measurements are taken. Power supply and transmission connections can again be made inductively, or through the lower logging unit or units to contacts on the abutments 66.

FIGS. 8 and 9 illustrate a pipe system comprising an outer pipe 70 having concentrically spaced within it a pipe assembly 71 consisting of pipe elements 72 and conductor elements 74. The pipe elements 74 are supported externally on the conductor elements 72, which thus constitute a liner for the conductor elements, but the pipe assembly 71 can otherwise correspond in function and configuration to any of the pipe assembly arrangements described above. As shown, the conductor elements 74 comprise a single tubular conductor 75 electrically insulated from the pipe elements 72 which it encloses by a first sleeve 76 of dielectric material, and surrounded by a second external sleeve of dielectric material 77. This pipe system is received within a fixed well casing 80, along which it can be advanced or retracted by appropriate topside equipment, and is concentrically located within the casing by packer elements such as the illustrated packer element 81.

The system of FIGS. 8 and 9 can be operated as a downhole production pipeline, being provided with a downhole isolating valve 82, and with a downhole logging unit 84 for providing production data to topside equipment by way of the conductor elements 74. The interior 85 of the liner or pipe elements 72 is used to convey the extracted gas or oil or mixture thereof, and the annular space 86 between the insulating sleeve 77 and the outer pipe 70 receives a barrier fluid. The barrier fluid can serve for protection of the conductor tubing and downhole equipment, and it can function a an hydraulic power reservoir additionally or instead.

Figure 11:
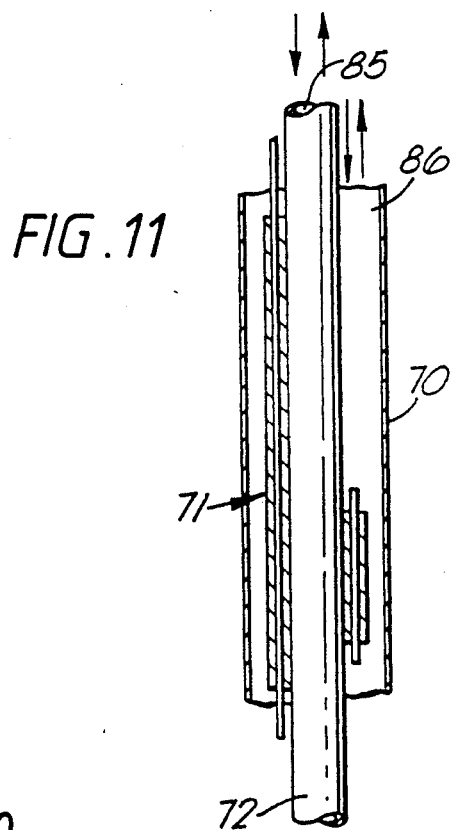
FIG. 11 is a fragmentary part-sectional view of the pipe system of FIG. 10.
Figure 10:
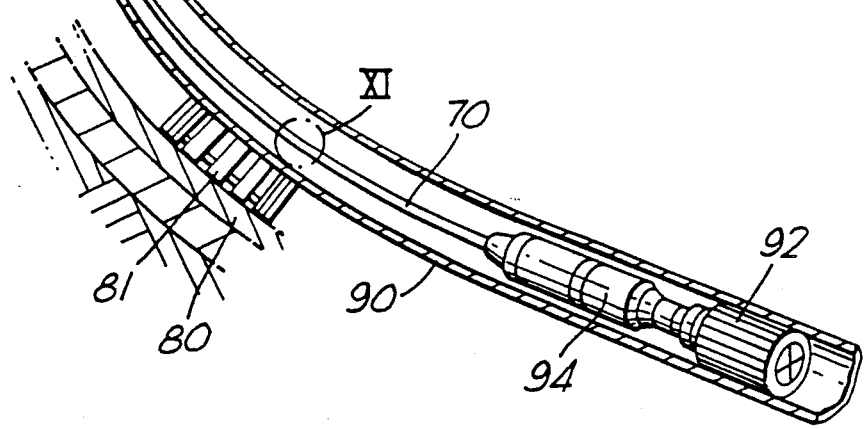
FIG. 10 is a perspective view of another pipe assembly in accordance with the invention in a downhole logging system.

FIGS. 10 and 11 show a pipe system of similar structure to that of FIGS. 8 and 9, the parts of which are designated by the same reference numerals as are used in those Figures. The system of FIGS. 10 and 11 is however employed not for production but for downhole logging, and is arranged to be movable along production tubing 90 which is received within a well casing 80 and concentrically spaced within it by packer elements 81. The pipe system carries at its downhole end a downhole electronic sensor or logging unit 92 and a traction unit 94 by which the system can be advanced or withdrawn along the production tubing 90. The traction unit 94 can comprise one or more linear electrical motor/stator windings which co-operate with the tubing, using this as a continuous rotor portion for the motor, or may comprise electrically driven wheels or rollers in driving engagement with the tubing wall. The pipe system can alternatively be moved along the production tubing 90 under fluid pressure or can be pushed along it mechanically.

The electrical conductor elements 74 are employed to power the unit 92 and to convey data and/or control signals between it and a topside supply station, as well as powering the drive or traction unit 94 if one is employed.

The fluid passages constituted by liner interior 85 and the annular space 86 can be employed for flow in either direction of barrier or other fluids for protection of the conductor tubing and downhole equipment. Fluid supplied along or circulated through these passages can be used for monitoring the operation of the system, as well as for cooling and/or lubrication of the downhole equipment. They can function also as hydraulic power reservoir if required.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A pipe assembly comprising:
    a pipe member having connector means at each end thereof for connection of the pipe member between cooperating pipe members in a pipestack.
    an elongate tubular electrical conductor element having means at each end thereof for electrical connection of the element between cooperating tubular conductor elements, said pipe member and said conductor element being shaped and dimensioned for relative lengthwise movement one within the other, and
    a preformed configuration provided on said conductor element and a cooperating preformed configuration on said pipe member engageable by said conductor element configuration, said configuration being so dimensioned that said conductor element is suspended thereby from said pipe member in predetermined concentric and lengthwise relationship therewith when said lengthwise relative movement has brought said configuration into engagement.

2. The pipe assembly of claim 1 wherein said conductor element is received within said pipe member and said cooperating configurations comprise an externally frusto-conical portion of said conductor element and an internally frusto-conical portion of said pipe member.

3. The pipe assembly of claim 1 wherein said pipe member surrounds said conductor element and said cooperating configurations comprise an internal annular step in said pipe member and an external annular step in said conductor element.

4. The pipe assembly of claim 1 wherein said cooperating configuration comprise screw-threaded portions on said pipe member and said conductor element.

5. The pipe assembly of claim 1 wherein said tubular conductor element has a first end adapted to receive therein an end of a first cooperating tubular conductor element and a second end adapted to be received in an end of a second cooperating tubular conductor.

6. The pipe assembly of claim 5 wherein said conductor element comprises two or more tubular conductors and insulating layers providing insulation for said tubular conductors, and wherein said means for electrical connection of said conductor element comprises exposed portions of said tubular conductors.

7. The pipe assembly of claim 5 wherein said means for electrical connection comprises spring conductor band having a bowed configuration radial cross-section.

8. The pipe assembly of claim 1 further compring a logging unit incorporated within said pipe member wall, and conductor means establishing electrical connection between said unit and said conductor element.

9. The pipe assembly of claim 1 wherein said conductor element is received within said pipe member, and further comprising abutment means extending inwardly of said tubular conductor element, and a sensor or logging unit slidable within said conductor element and supported on said abutment means.

10. The pipe assembly of claim 9 further comprising electrical contact means on said unit and on said abutment means, said contact means being adapted to establish electrical communication between said unit and said conductor element.

11. A pipe system comprising:

a plurality of pipe members connected together, a plurality of tubular electrical conductor elements connected together and received within said pipe members, a logging or sensor unit movable along said system within said tubular conductor elements, a fluid passage extending lengthwise through said unit, non-return valve means permitting flow through said passage in the direction of said movement of said unit, and abutment means projecting inwardly of one of said tubular conductor elements and engageable with said unit to thereby limit said movement thereof.

12. The pipe system of claim 11 further comprising mating electrical contacts on said unit and said abutment means.

13. The pipe system of claim 11 wherein said plurality of conductor elements is slidable lengthwise within said plurality of pipe member and further comprising abutment means formed on at least one of said conductor elements and at least one of said pipe members limiting said sliding movement.

14. The pipe system of claim 11 wherein each of said tubular conductor elements has a spigot end portion received in a socket end portion of the conductor adjacent element so as to be electrically connected thereto.

15. The pipe system of claim 11 further comprising outer piping coaxially surrounding said plurality of pipe members with spacing therefrom to define a fluid passage.

16. A pipe system for fluid and electrical connection between topside and downhole equipment comprising:

an outer pipe means, and an inner pipe assembly, said inner pipe assembly being located within said outer pipe means with spacing to provide a first fluid passage therebetween, wherein said inner pipe assembly comprises inner pipe means, a tubular electrical conductor means and cooperating abutment means on said inner pipe means and said tubular conductor means, whereby said tubular conductor means is supported by said inner pipe means in substantially coaxial relationship therewith by engagement of said cooperating abutment means, one of said inner pipe means and said tubular electrical conductor means providing a second fluid passage therewithin.

17. The pipe system of claim 16 wherein said tubular conductor means comprises at least one tubular conductor and solid insulation means therefor, and wherein said tubular conductor means surrounds said inner pipe means, the interior of said inner pipe means providing said second fluid passage.

18. The pipe system of claim 16 wherein said inner pipe means constitutes a conductor additional to said tubular electrical conductor means.

19. The pipe system of claim 16 wherein said downhole equipment comprises an isolating valve and a downhole logging unit, said first fluid passage carries extracted fluid and said second fluid passage receives a barrier fluid.

20. The pipe system of claim 16 wherein said downhole equipment comprises a sensor or logging unit in electrical communication with said topside equipment by way of said tubular conductor means.

21. The pipe system of claim 16 wherein said downhole equipment includes at least one electrically driven traction unit for advancing or withdrawing said system along a well casing or production tubing, said traction unit being powered from said topside equipment by way of said tubular conductor means.

22. A pipe system comprising:

a plurality of pipe members connected together in end-to-end relation, a plurality of tubular electrical conductor elements extending in end-to-end relation within said connected plurality of pipe members, said plurality of tubular electrical conductor elements defining a passage extending internally therealong, a logging or sensor unit, said unit making a free sliding fit within said passage for movement therealong, abutment means projecting inwardly of one of said plurality of tubular electrical conductor elements and adapted to be engaged by said logging or sensor unit to thereby limit said movement thereof.

23. The pipe system of claim 22 further comprising cooperating electrical contact means located on said unit and on said abutment means.

24. The pipe system of claim 22 further comprising means establishing at least one of an electrical power supply connection and a signal transmission connection between said logging or sensor unit and said one of said tubular electrical conductor elements.

25. The pipe assembly of claim 1 having said pipe member connected between cooperating pipe members in a pipe stack by said connector means and said conductor element electrically connected between cooperating conductor elements by said electrical connection means, wherein said pipe member connector means comprises screw-threaded connector means and said electrical connection means comprises spigot and socket connector means.

* * * * *